(12) United States Patent
Rodriguez et al.

(10) Patent No.: US 6,978,310 B1
(45) Date of Patent: Dec. 20, 2005

(54) MEDIA-ON-DEMAND CATALOG VIEWING PREFERENCE SYSTEM

(75) Inventors: Arturo A. Rodriguez, Norcross, GA (US); Robert O. Banker, Cumming, GA (US); Dean F. Jerding, Roswell, GA (US)

(73) Assignee: Scientific-Atlanta, Inc, Lawrenceville, GA (US)

( * ) Notice: Subject to any disclaimer, the term of this patent is extended or adjusted under 35 U.S.C. 154(b) by 874 days.

(21) Appl. No.: 09/692,986

(22) Filed: Oct. 20, 2000

Related U.S. Application Data

(63) Continuation-in-part of application No. 09/590,488, filed on Jun. 9, 2000.

(60) Provisional application No. 60/138,756, filed on Jun. 11, 1999, provisional application No. 60/170,302, filed on Dec. 13, 1999.

(51) Int. Cl.[7] .................. G06F 15/16; G06F 15/173
(52) U.S. Cl. .................. 709/231; 709/203; 709/226; 709/229; 348/14.07
(58) Field of Search .................. 709/225–226, 709/229, 231–232, 202–203; 348/14.03, 348/14.05, 14.07

(56) References Cited

U.S. PATENT DOCUMENTS

| | | | |
|---|---|---|---|
| 5,479,268 A | 12/1995 | Young et al. | 358/335 |
| 5,809,204 A | 9/1998 | Young et al. | 386/83 |
| 5,973,683 A * | 10/1999 | Cragun et al. | 715/719 |
| 5,978,043 A * | 11/1999 | Blonstein et al. | 348/569 |
| 6,005,631 A * | 12/1999 | Anderson et al. | 725/53 |
| 6,072,520 A * | 6/2000 | Yuen et al. | 725/27 |
| 6,104,334 A * | 8/2000 | Allport | 341/175 |
| 6,239,794 B1 * | 5/2001 | Yuen et al. | 725/41 |
| 6,317,779 B1 * | 11/2001 | Gile et al. | 709/217 |
| 6,323,911 B1 * | 11/2001 | Schein et al. | 348/552 |
| 6,442,598 B1 * | 8/2002 | Wright et al. | 709/217 |
| 6,445,306 B1 * | 9/2002 | Trovato et al. | 340/825.24 |
| 6,571,390 B1 * | 5/2003 | Dunn et al. | 725/52 |
| 6,637,029 B1 * | 10/2003 | Maissel et al. | 725/46 |
| 6,642,939 B1 * | 11/2003 | Vallone et al. | 715/721 |
| 6,643,715 B1 * | 11/2003 | Arthur | 710/14 |
| 6,662,365 B1 * | 12/2003 | Sullivan et al. | 725/25 |
| 6,684,240 B1 * | 1/2004 | Goddard | 709/217 |
| 6,732,180 B1 * | 5/2004 | Hale et al. | 709/229 |
| 6,732,367 B1 * | 5/2004 | Ellis et al. | 725/27 |
| 6,735,628 B2 * | 5/2004 | Eyal | 709/231 |
| 6,782,550 B1 * | 8/2004 | Cao | 725/39 |

* cited by examiner

Primary Examiner—Bharat Barot

(57) ABSTRACT

The invention can be viewed as a system for providing media information to a user via an interactive media services client device coupled to a programmable television services server device. A method of the preferred embodiment of the present invention includes receiving user input and excluding one or more media titles from a media title list based on the user input.

13 Claims, 16 Drawing Sheets

DELETION CONFIRMATION

Are You Sure You Wand To Delete The Title "Angela's Ashes" From The Movie Title List?

D Delete

E Keep In Title List

DELETION CONFIRMATION

Do You Want To Delete The Title "Angela's Ashes" Permanently Or Just During This Session?

D Delete Permanently

E Delete Temporarily

FIG. 7

MEDIA-ON-DEMAND CATALOG VIEWING PREFERENCE SYSTEM

CROSS-REFERENCE TO RELATED APPLICATIONS

This application is a continuation-in-part of Application No. 09/590,488, filed on Jun. 9, 2000, which claims the benefit of Provisional application Nos. 60/138,756 filed Jun. 11, 1999 and No. 60/170,302 filed Dec. 13, 1999, which is entirely incorporated herein by reference.

FIELD OF THE INVENTION

This invention relates in general to television systems, and more particularly, to the field of media-on-demand.

BACKGROUND OF THE INVENTION

With recent advances in digital transmission technology, cable television systems are now capable of providing much more than the traditional analog broadcast video. In implementing enhanced programming, the home communication terminal ("HCT"), otherwise known as the settop box, has become an important computing device for accessing video services and navigating a subscriber through a maze of available services. In addition to supporting traditional analog broadcast video functionality, digital HCTs (or "DHCTs") now also support an increasing number of two-way digital services such as video-on-demand.

Typically, a DHCT is connected to a cable or satellite television network and includes hardware and software necessary to provide the functionality of the digital television system at the client's site. Preferably, some of the software executed by a DHCT is downloaded and/or updated via the cable television network. Each DHCT also typically includes a processor, communication components and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

DHCTs are capable of providing users with a very large number and variety of purchasable media rentals and/or non-purchasable on-demand media. Given the vast number of years that film and television studios have produced movies, television programs and audio programs, copious media titles can be offered for convenient on-demand viewing. As the number of available on-demand media increases, it can become inconvenient and time consuming for users to continually browse through unwanted media titles in order to find the ones that they like. Therefore there exists a need to make it easier and more convenient for users to browse through available media titles.

SUMMARY OF THE INVENTION

The invention can be viewed as a system for providing media information to a user via an interactive media services client device coupled to a programmable television services server device. A method of the preferred embodiment of the present invention includes receiving user input and excluding one or more media titles from a media title list based on the user input.

BRIEF DESCRIPTION OF THE DRAWINGS

The invention can be better understood with reference to the following drawings.

The components in the drawings are not necessarily drawn to scale, emphasis instead being placed upon clearly illustrating the principles of the present invention. In the drawings, like reference numerals designate corresponding parts throughout the several views.

FIG. 6 depicts an example deletion confirmation window that is presented to a user after the user requests the deletion of a media title via the title selection window depicted in FIG. 5.

FIG. 7 depicts an alternative embodiment to the deletion confirmation window shown in FIG. 6.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
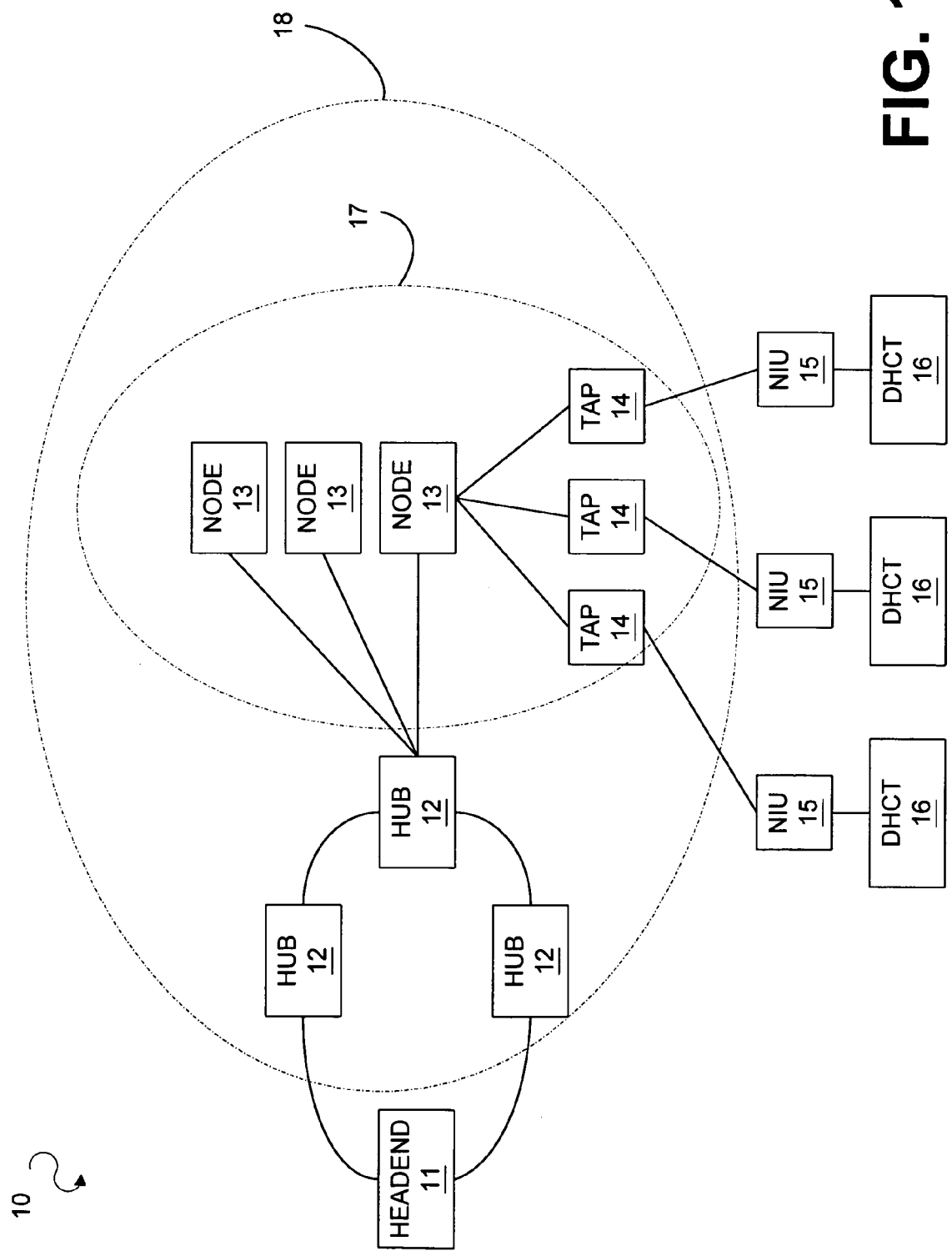
FIG. 1 is a block diagram of a cable television system in accordance with one preferred embodiment of the present invention.

The present invention is generally implemented as part of a cable television system (CTS). Hence, an illustrative CTS 10 and its operation will be described initially. FIG. 1 shows a block diagram view of a CTS 10, which is generally a high quality, reliable and integrated network system that features video, audio, voice and data services to DHCT users. Although FIG. 1 depicts a high level view of a CTS 10, it should be appreciated that a plurality of cable television systems can tie together a plurality of regional networks into an integrated global network so that DHCT users can receive content provided from anywhere in the world.

The CTS 10 delivers broadcast video signals as digitally formatted signals in addition to delivering traditional broadcast analog video signals. Furthermore, the system can support one way broadcast services as well as both one-way data services and two-way media and data services. The two-way operation of the network allows for user interactivity with services, such as Pay-Per-View programming, Near Video-On-Demand (NVOD) programming according to any of several known NVOD implementation methods, View-on-Demand (VOD) programming (according to any of several known VOD implementation methods), and interactive applications, such as Internet connections and interactive media Guide (IMG) applications.

The CTS 10 also provides the interfaces, network control, transport control, session control, and servers to access content and services, and distributes content and services to DHCT users. As shown in FIG. 1, a typical CTS 10 comprises a headend 11, hubs 12, an HFC access network 17, and users' digital home communication terminals (DHCTs) 16. It should be appreciated that although a single component (e.g. a headend) is illustrated in FIG. 1, a CTS 10 can feature a plurality of any one of the illustrated components or may be configured with alternative embodiments for any one of the individual components or with yet other additional components not enumerated above. A content provider (not shown) transmits media content to a headend for further transmission to users downstream in the network.

Content provided by a content provider is communicated by the content provider to one or more headends 11. From those headends the content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which is connected to a network interface unit (NIU) 15 which is connected to a DHCT 16. The NIU 15 is normally located at a user's property and provides a transparent interface between the HFC node 13 and the users' internal wiring. Coaxial cables are typically used to couple nodes 13, taps 14 and NIUs 15 because the electrical signals can be easily repeated with radio frequency (RF) amplifiers.

As the high-level operations of many of the functions of CTSs 10 are well known to those of skill in the art, further description of the overall CTS 10 of FIG. 1 will not be contained herein. It will be appreciated, however, that the CTS 10 shown in FIG. 1 is merely illustrative and should not be construed as implying any limitations upon the scope of the present invention.

Figure 2:
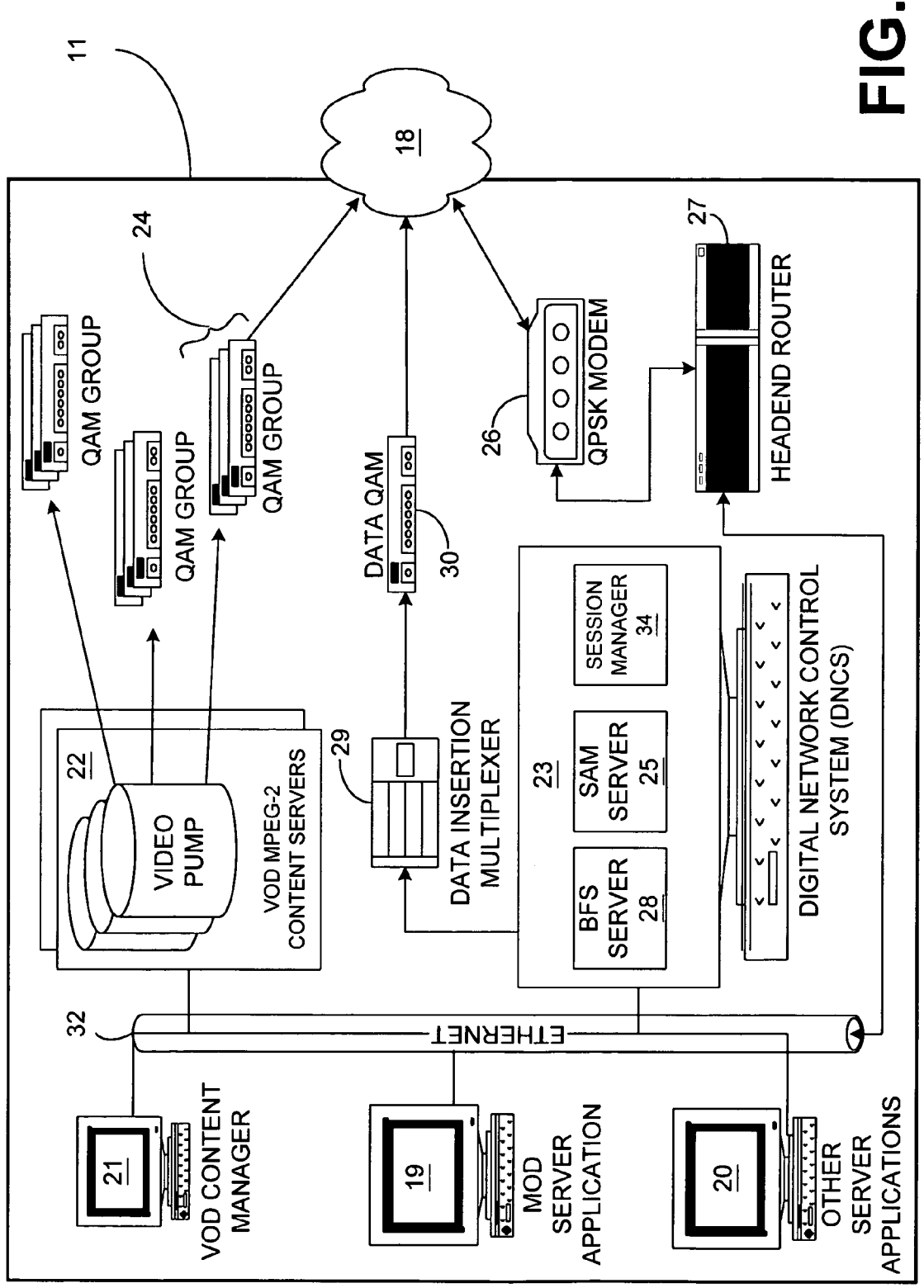
FIG. 2 is a diagram of the headend 11 as depicted in FIG. 1.

FIG. 2 is a block diagram of portions of a headend 11 that is configured to provide media-on-demand (MOD) services in accordance with one embodiment of the present invention. MOD services include, among other things, video-on-demand (VOD) services and respective MOD information suitable to be presented to a user via display of an interactive media guide. MOD server application 19 and a plurality of other server applications 20 are connected to a digital network control system (DNCS) 23 via a high-speed network such as an Ethernet connection 32. The MOD server application 19 is responsible for reserving and configuring system resources needed to provide MOD services and for providing configuration and service data to an MOD client application 63 (FIG. 3), including MOD information comprising a catalog of titles available for on-demand viewing and/or on-demand rental by a user.

The DNCS 23 provides complete management, monitoring, and control of the network's elements and broadcast services provided to users. In one implementation, the DNCS 23 uses a data insertion multiplexer 29 and a data QAM 30 to insert in-band broadcast file system (BFS) data into an MPEG-2 transport stream that is broadcast and received via DHCT's communication interface 42 and tuner system 45. The DNCS 23 also contains a session manager 34 that uses Digital Storage Media Command and Control (DSMCC) protocol to set up and maintain MOD sessions. The session manager 34 processes user to network (U-N) session signaling messages, manages allocation of session-related network resources, supports network management operations, acts as a point of contact to the network for the DHCT's 16 in the network 18 to establish individual sessions, and supports MOD services by providing the signaling interface to establish, maintain and release client initiated exclusive sessions.

A service application manager (SAM) server 25 is a server component of a client-server pair of components, with the client component being located at the DHCT 16. Together, the client-server SAM components provide a system in which the user can access services, which are identified by an application to run and a parameter, such as particular data content, specific to that service. The client-server SAM components also manage the life cycle of the applications on the system, including the definition, activation, and suspension of services they provide and the downloading of the applications into the DHCT 16 as necessary.

Applications on both the headend 11 and the DHCT 16 can access the data stored in a broadcast file system (BFS) server 28 in a similar manner to a file system found on operating systems. The BFS server 28 is a part of a broadcast file system that has a counterpart BFS client module 43 (FIG. 3) in a DHCT 16 connected to the network 18. The BFS server 28 repeatedly sends data for applications on a data carousel (not shown) over a period of time in cyclical repeated fashion so that a DHCT 16 that is in need of reading any particular data file or parts thereof may receive it when requested by a user or one or more of its internal running processes.

A VOD content manager 21 is responsible for managing the content on the VOD content servers 22. The MOD server application 19 controls both the VOD content manager 21 and the VOD content servers 22 and utilizes them to help deliver the video and audio streams that make up VOD services. In one embodiment, an MOD content manager and MOD content servers (not shown) could run respectively in parallel to the VOD content manager 21 and VOD content servers 22 to manage other types of on-demand media content. In an alternate embodiment an MOD content manager replaces the VOD content manager 21 and the MOD content servers replaces the VOD content servers 22. The QAM modulators that comprise the QAM group 24 receive the MPEG-2 transport streams from the VOD content servers 22, convert them into encrypted RF signals at a specified frequency (channel), and transmit them to a DHCT 16 via the network 18.

The QPSK modem 26 is responsible for transporting the out-of-band IP (internet protocol) datagram traffic between the distribution headend 11 and a DHCT 16. Data from the QPSK modem 26 is routed by headend router 27 within the headend 11. The headend router 27 is also responsible for delivering upstream application traffic to the various server applications 19 & 20.

Figure 3:
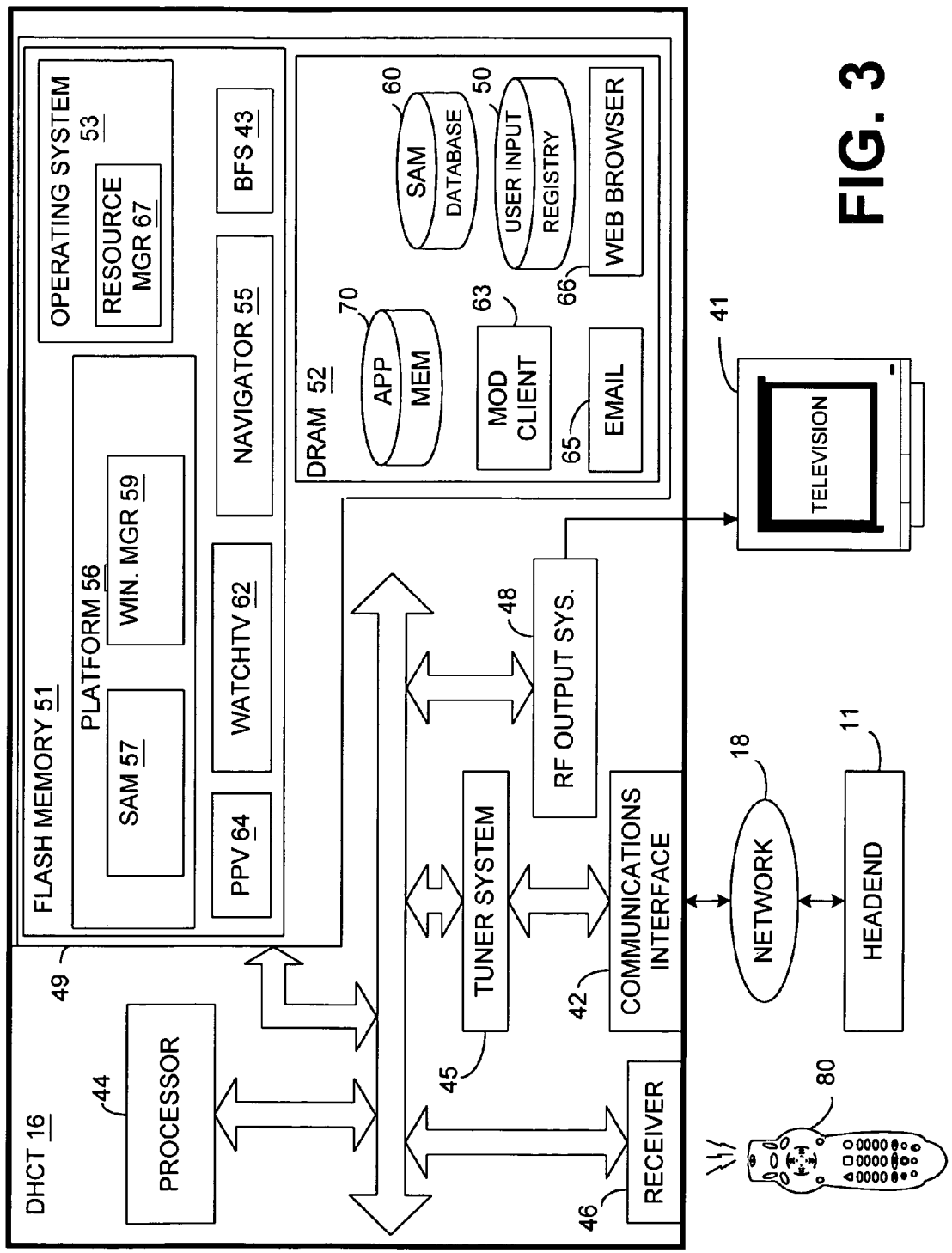
FIG. 3 is a block diagram of a DHCT and related equipment, in accordance with one preferred embodiment of the present invention depicted in FIG. 1.

FIG. 3 is a block diagram illustrating a DHCT 16 that is coupled to a headend 11 and to a television 41. Some of the functionality performed by applications executed in the DHCT 16 (such as the MOD client application 63) may instead be performed at the headend 11 and vice versa. A DHCT 16 is typically situated at a user's residence or place of business and may be a stand alone unit or integrated into another device such as, for example, a television set or a personal computer. The DHCT 16 preferably includes a communications interface 42 for receiving signals (video, audio and/or other data) from the headend 11 through the network 18 and for providing any reverse information to the headend 11 through the network 18. The DHCT 16 further includes at least one processor 44 for controlling operations of the DHCT 16, an RF output system 48 for driving the television display 41, and a tuner system 45 for tuning into a particular television channel to be displayed and for sending and receiving various types of data or media from the headend 11. The tuner system 45 includes, in one implementation, an out-of-band tuner for bi-directional quadrature phase shift keying (QPSK) data communication and a quadrature amplitude modulation (QAM) tuner for receiving television signals. Additionally, a receiver 46 receives externally-generated information, such as user inputs or commands from other devices.

The DHCT 16 may also include one or more wireless or wired interfaces, also called ports, for receiving and/or transmitting data to other devices. For instance, the DHCT 16 may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device or keyboard that includes user-actuated buttons.

In one implementation, the DHCT 16 includes system memory 49, which includes flash memory 51 and dynamic random access memory (DRAM) 52, for storing various applications, modules and data for execution and use by the processor 44. Basic functionality of the DHCT 16 is provided by an operating system 53 that is primarily stored in flash memory 51. Among other things, the operating system 53 includes at least one resource manager 67 that provides an interface to resources of the DHCT 16 such as, for example, computing resources.

One or more programmed software applications, herein referred to as applications, are executed by utilizing the computing resources in the DHCT 16. Applications stored in flash memory 51 or DRAM 52 are executed by processor 44 (e.g., a central processing unit or digital signal processor) under the auspices of the operating system 53. Data required as input by an application is stored in DRAM 52 or flash memory 51 and read by processor 44 as need be during the course of the application's execution. Input data may be data stored in DRAM 52 by a secondary application or other source, either internal or external to the DHCT 16, or possibly anticipated by the application and thus created with the application at the time it was generated as a software application, in which case it is stored in flash memory 51. Data generated by an application is stored in DRAM 52 by processor 44 during the course of the application's execution. DRAM 52 also includes application memory 70 that various applications may use for storing and/or retrieving data.

An application referred to as navigator 55 is also resident in flash memory 51 for providing a navigation framework for services provided by the DHCT 16. The navigator 55 registers for and in some cases reserves certain user inputs related to navigational keys such as channel increment/ decrement, last channel, favorite channel, etc. The client applications may be resident in flash memory 51 or downloaded into DRAM 52. The navigator 55 also provides users with television related menu options that correspond to DHCT functions such as, for example, providing an interactive program guide, blocking a channel or a group of channels from being displayed in a channel menu, and displaying a video-on-demand purchase list.

The flash memory 51 also contains a platform library 56. The platform library 56 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 56 that are shown in FIG. 3 are a window manager 59 and a service application manager (SAM) client 57.

The window manager 59 provides a mechanism for implementing the sharing of the screen regions and user input. The window manager 59 on the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 59 also maintains, among other things, a user input registry 50 in DRAM 52 so that when a user enters a key or a command via the remote control device 80 or another input device such as a keyboard or mouse, the user input registry 50 is accessed to determine which of various applications running on the DHCT 16 should receive data corresponding to the input key and in which order. As an application is executed, it registers a request to receive certain user input keys or commands. When the user presses a key corresponding to one of the commands on the remote control device 80, the command is received by the receiver 46 and relayed to the processor 44. The processor 44 dispatches the event to the operating system 53 where it is forwarded to the window manager 59 which ultimately accesses the user input registry 50 and routes data corresponding to the incoming command to the appropriate application.

The SAM client 57 is a client component of a client-server pair of components, with the server component being located on the headend 11. A SAM database 60 in DRAM 52 includes a data structure of services and a data structure of channels that are created and updated by the headend 11. Many services can be defined using the same application component, with different parameters. Examples of services include, without limitation and in accordance with one implementation, presenting television programs (available through a WatchTV application 62), pay-per-view events (available through a PPV application 64), digital music (not shown), media-on-demand (available through an MOD application 63), and an interactive program guide. In general, the identification of a service includes the identification of an executable application that provides the service along with a set of application-dependent parameters that indicate to the application the service to be provided. As a non-limiting example, a service of presenting a television program could be executed with a set of parameters to view HBO or with a separate set of parameters to view CNN. Each association of the application component (tune video) and one parameter component (HBO or CNN) represents a particular service that has a unique service I.D. The SAM client 57 also interfaces with the resource manager 67, as discussed below, to control resources of the DHCT 16.

Application clients can also be downloaded into DRAM 52 at the request of the SAM client 57, typically in response to a request by the user or in response to a message from the headend. In this non-limiting example DRAM 52 contains a media-on-demand application (MOD) 63, an e-mail application 65, and a web browser application 66, among others (not shown). It should be clear to one with ordinary skill in the art that these applications are not limiting and merely serve as examples for this present embodiment of the invention. Furthermore, one or more DRAM based applications may, as an alternative embodiment, be resident in flash memory 51. These applications, and others provided by the cable system operator, are top level software entities on the network for providing services to the user.

In one implementation, applications executing on the DHCT 16 work with the navigator 55 by abiding by several guidelines. First, an application utilizes the SAM client 57 for the provision, activation, and suspension of services. Second, an application shares DHCT 16 resources with other applications and abides by the resource management policies of the SAM client 57, the operating system 53, and the DHCT 16. Third, an application handles situations where resources are only available with navigator 55 intervention. Fourth, when an application loses service authorization while providing a service, the application suspends the service via the SAM (the navigator 55 will reactivate an individual service application when it later becomes authorized). Finally, an application client is designed to not have access to certain user input keys reserved by the navigator (i.e., power, channel +/−, volume +/−, etc.).

The MOD client application 63 provides the user with lists of available media titles to choose from and with video presentations requested by the user. The MOD client application 63 provides video presentations to the user by engaging, preferably, in a direct two-way IP (Internet Protocol) connection with VOD content servers 22 (FIG. 2). The MOD client application 63 is also responsible for providing title deletion functionality as described below. In an alternative embodiment, the title deletion functionality is provided by a separate application that can be selectively aggregated to the MOD client application 63 for purposes of charging separately for that functionality.

An executable program or algorithm corresponding to an operating system (OS) component, or to a client platform component, or to a client application, or to respective parts thereof, can reside in and execute out of DRAM 52 and/or flash memory 51. Likewise, data inputted into or outputted from any executable program can reside in DRAM 52 or flash memory 51. Furthermore, an executable program or algorithm corresponding to an OS component, or to a client platform component, or to a client application, or to respective parts thereof, can reside in flash memory 51, or in a local storage device connected to DHCT 16 and be transferred into DRAM 52 for execution. Likewise, data input for an executable program can reside in flash memory 51 or a storage device and be transferred into DRAM 52 for use by an executable program or algorithm. In addition, data outputted by an executable program can be written into DRAM 52 by an executable program or algorithm and be transferred into flash memory 51 or into a storage device for storage purposes. The present invention is not limited by where or how data and/or applications are stored or retrieved.

Each of the above mentioned applications comprises executable instructions for implementing logical functions and can be embodied in any computer-readable medium for use by or in connection with an instruction execution system, apparatus, or device, such as a computer-based system, processor-containing system, or other system that can fetch and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

Figure 4:
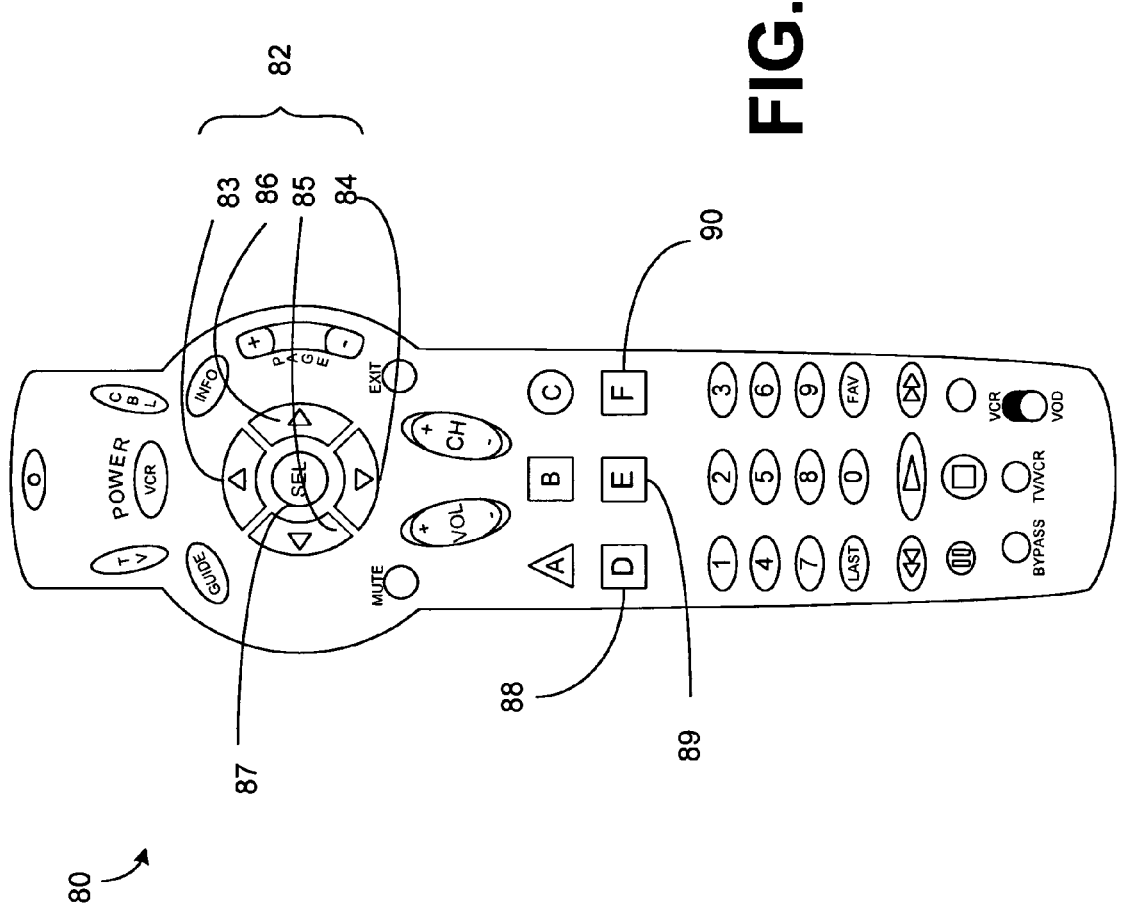
FIG. 4 is a remote control device that can be used to provide user input to the DHCT shown in FIG. 3.

FIG. 4 illustrates a non limiting example of a remote control device 80 that is used to provide user input to the DHCT 16. The arrow buttons 82 include an up arrow button 83, a down arrow button 84, a left arrow button 85, and a right arrow button 86 that are used to scroll through options and/or to highlight an option. The select button 87 may be used to select a currently highlighted option that is provided to the user. Other buttons that are available on the remote control device will be discussed further below. Many alternative methods of providing user input may be used including a remote control device with different buttons and/or button layouts, a keyboard device, a voice activated device, etc. The invention described herein is not limited by the type of device used to provide user input.

Figure 5:
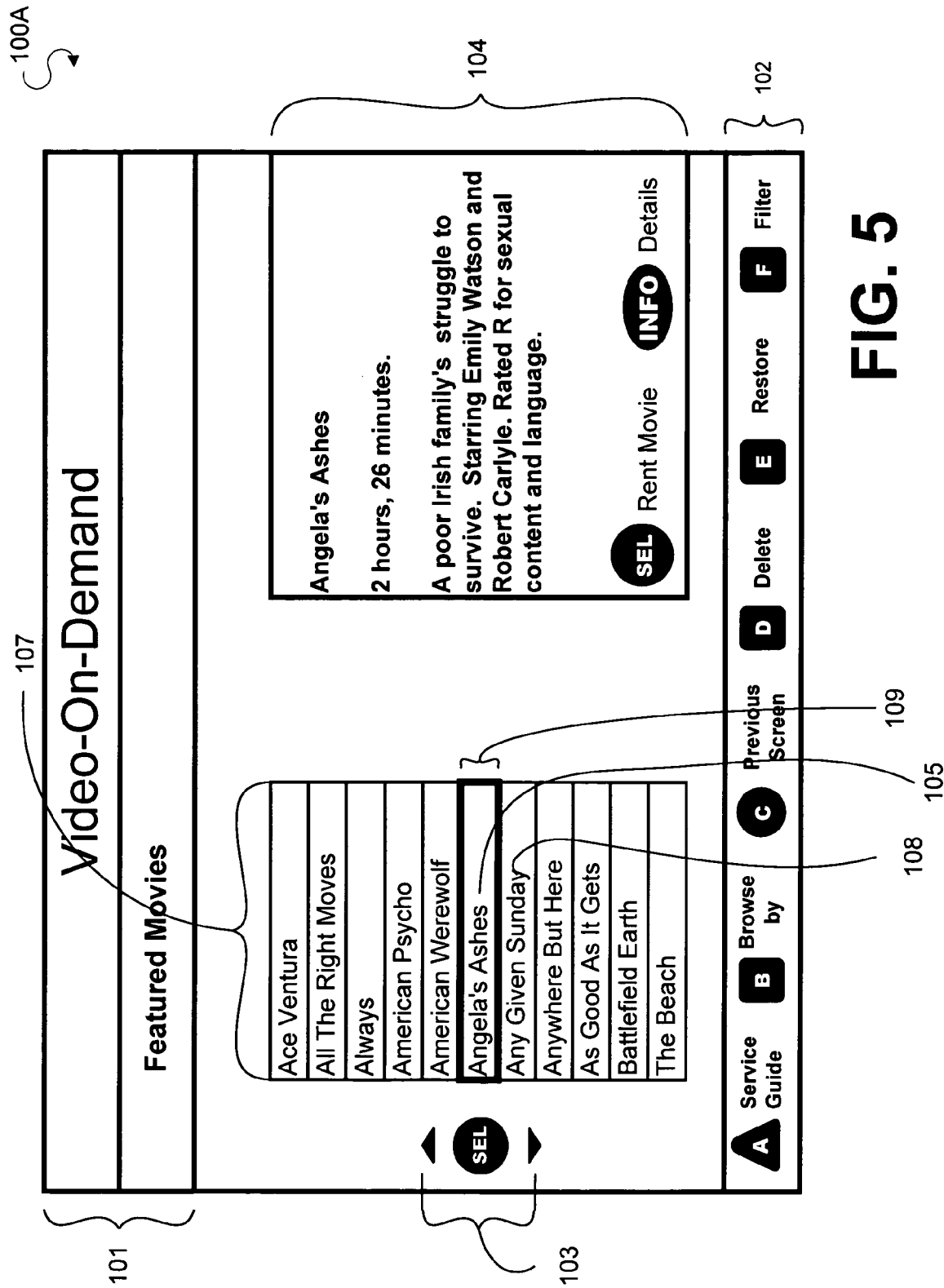
FIG. 5 depicts an example title selection window that illustrates a media title list presented to the user by the DHCT of FIG. 3.

With continued reference to FIGS. 3 and 4 throughout the remaining figures, FIG. 5 depicts an example media title deletion window 100A. As with other window examples discussed below, processor 44 executes program instructions of MOD client application 63 that cause it to direct the window manager 59 to create window 100A via display data that is formatted for television 41. Processor 44 stores the display data or parts thereof in DRAM 52 (as necessary) and transfers the display data to a display output system such as RF output system 48 wherein display data is converted to respective television signals and transmitted to television 41. Of course, the scope of the invention also includes any other method of causing the described windows to appear to the user.

The example window 100A contains a top portion 101 that typically contains one or more headings and a bottom portion 102 that typically illustrates relevant buttons available on the remote control device 80. Media title list 107 contains media titles that are retrieved by MOD client application 63 from application memory 70. Information section 104 contains information related to a media title shown in a highlighted title area 109, which in this example is "Angela's Ashes" 105. Browsing symbol 103 suggests to the user that the user may use the up and down arrow buttons 83, 84 on the remote control device 80 to browse the media title list 107 and use the select button 87 to request the currently highlighted media title. For example the user may activate the down arrow button on the remote control device in order to cause the media title "Any Given Sunday" 108 to be displayed in the highlighted title area 109 and then activate the select button 87 in order to request the movie. In an alternative embodiment activating the up an down arrows on the remote control device 80 would result in shifting the highlighted title area rather than shifting the media title list. The user may delete the media title currently shown in the highlighted title area 109 from the media title list 107 by pressing the "D" button 88 on the remote control device 80. Instead of a single dedicated key in an input device to invoke the delete functionality, in an alternate embodiment, a combination of keys pressed simultaneously or in sequential order are designated for deleting a highlighted media title.

FIGS. 6 and 7 depict example confirmation windows 110A and 110B that serve as alternative intermediate confirmation steps prior to the implementation of a title deletion. This intermediate confirmation step ensures that the user wishes to delete the highlighted title from the media title list and reduces accidental deletions. Example window 110A prompts the user to either confirm the deletion by pressing the "D" button 88 or to cancel the deletion by pressing the "E" button 89. Example window 110B, on the other hand, prompts the user for input on whether the deletion is to be effective permanently (via the "D" button 88) or just during the current on-demand title selection session (via the "E" button 89). Information identifying a deleted media title and its corresponding deletion duration is stored in application memory 70, such as in a database, by MOD client application 63 in order prevent the deleted media title from being included in media title lists subsequently presented to the user, including after receiving additional title information from the MOD server application 19. A user may, however, undelete a media title by following the procedure illustrated further below.

Figure 8:
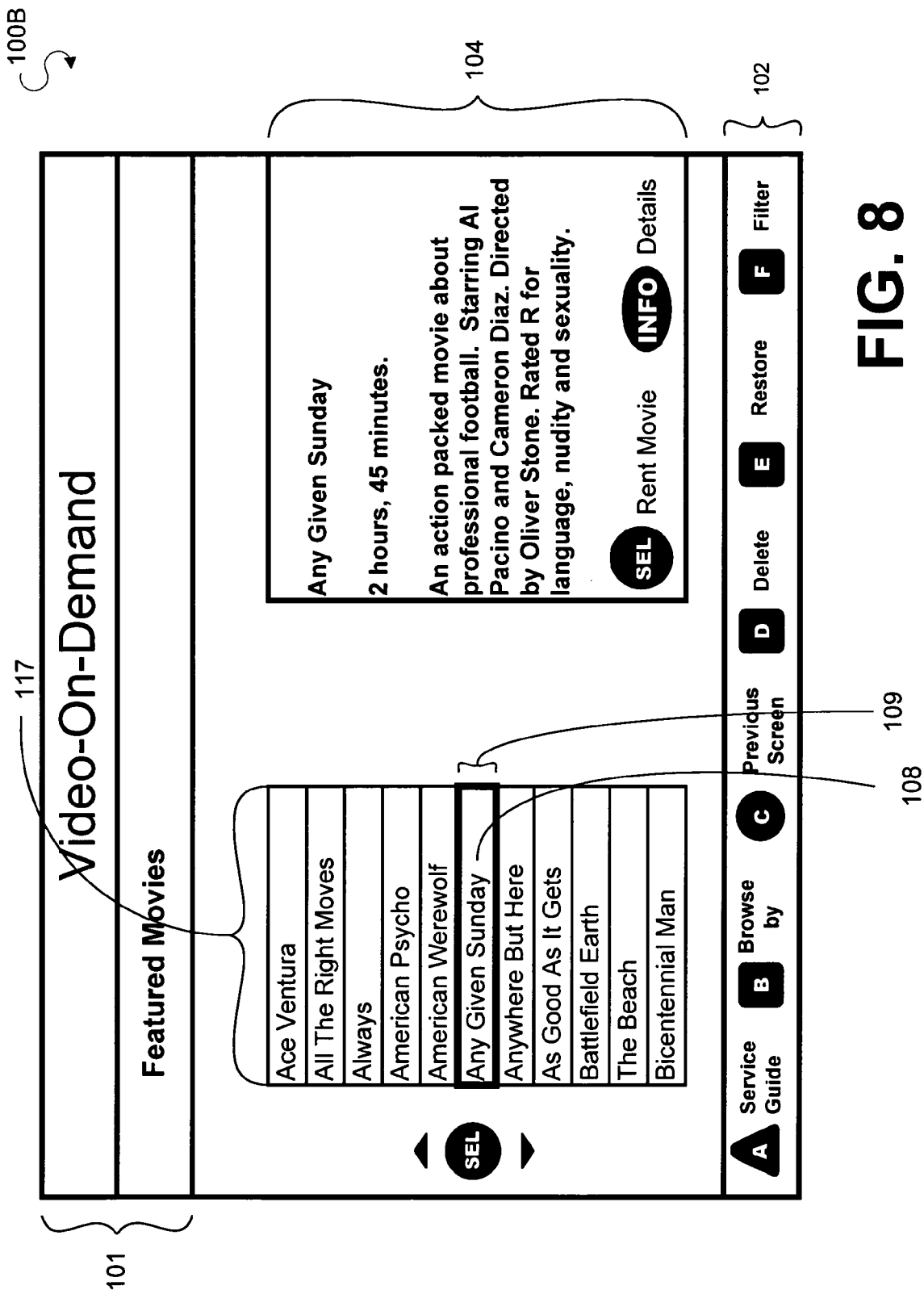
FIG. 8 depicts an example window that illustrates the deletion of a media title from the media title list of FIG. 5.

FIG. 8 depicts an example window 1000B illustrating the deletion of a media title from the media title list 107 (FIG. 5). Example window 100B is presented to the user after the user activates the "D" button 88 on the remote control device 80 while being presented with example window 100A and then confirms the deletion request by re-activating the "D" button 88 while being presented with a confirmation window (110A or 110B). The media title previously shown in the highlighted title area 109 is deleted and replaced by the next media title on the media title list 107 (FIG. 5). In this example, the title "Angela's Ashes" 105 (FIG. 5) is deleted and replaced with the title "Any Given Sunday" 108.

Figure 9:
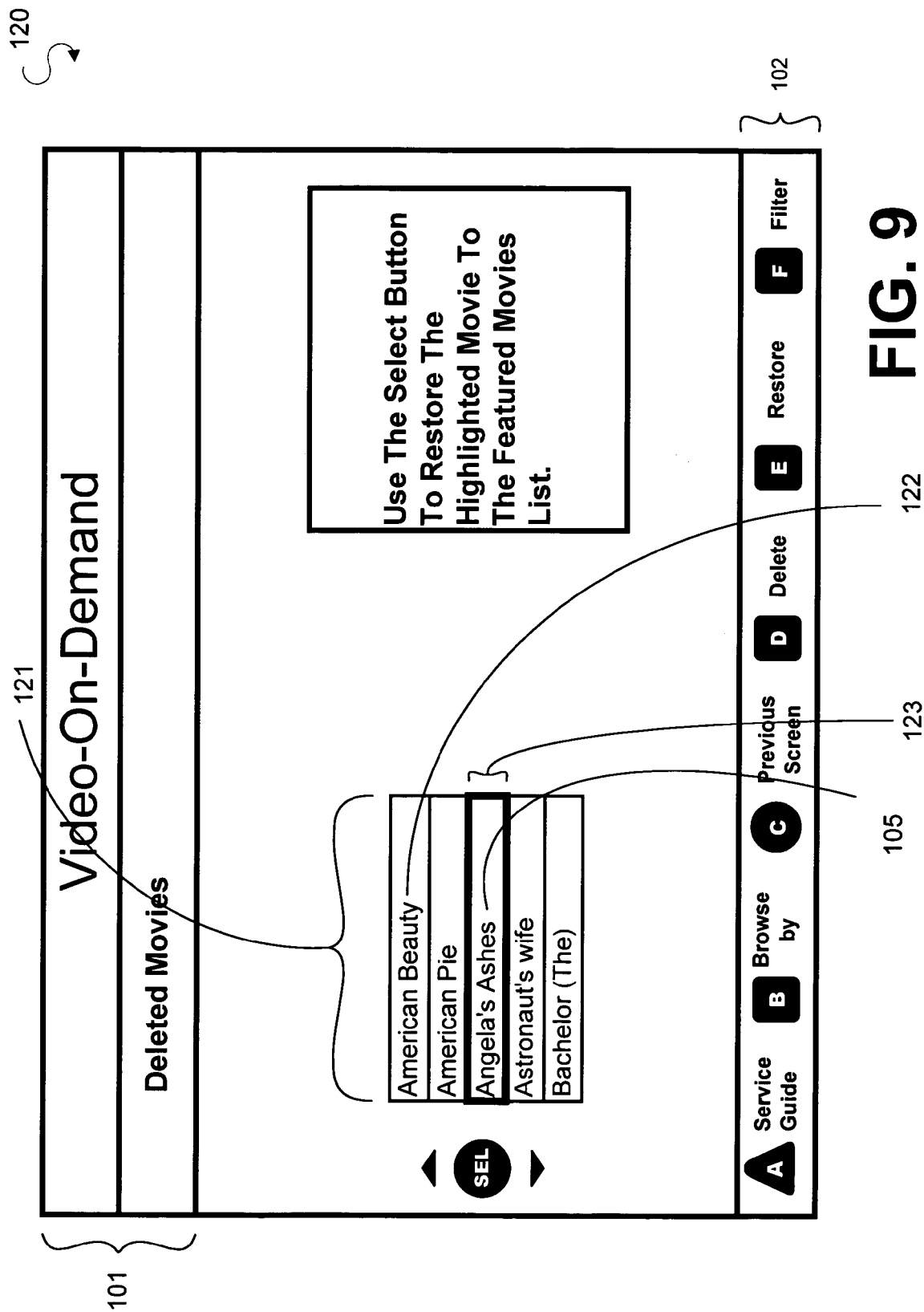
FIG. 9 depicts an example window that illustrates the process of restoring a deleted media title to the media title list shown in FIG. 8.

FIG. 9 depicts an example window 120 illustrating the process of undeleting a media title. Example window 120 is presented to the user after the user activates the "E" button 89 on the remote control device 80 while being presented with example window 110 (FIG. 8). The user can undelete a highlighted media title by activating the select button 87. Upon being undeleted, a media title will no longer be identified in application memory 70 as being deleted and will be shown in media title lists subsequently presented to the user.

Figure 10:
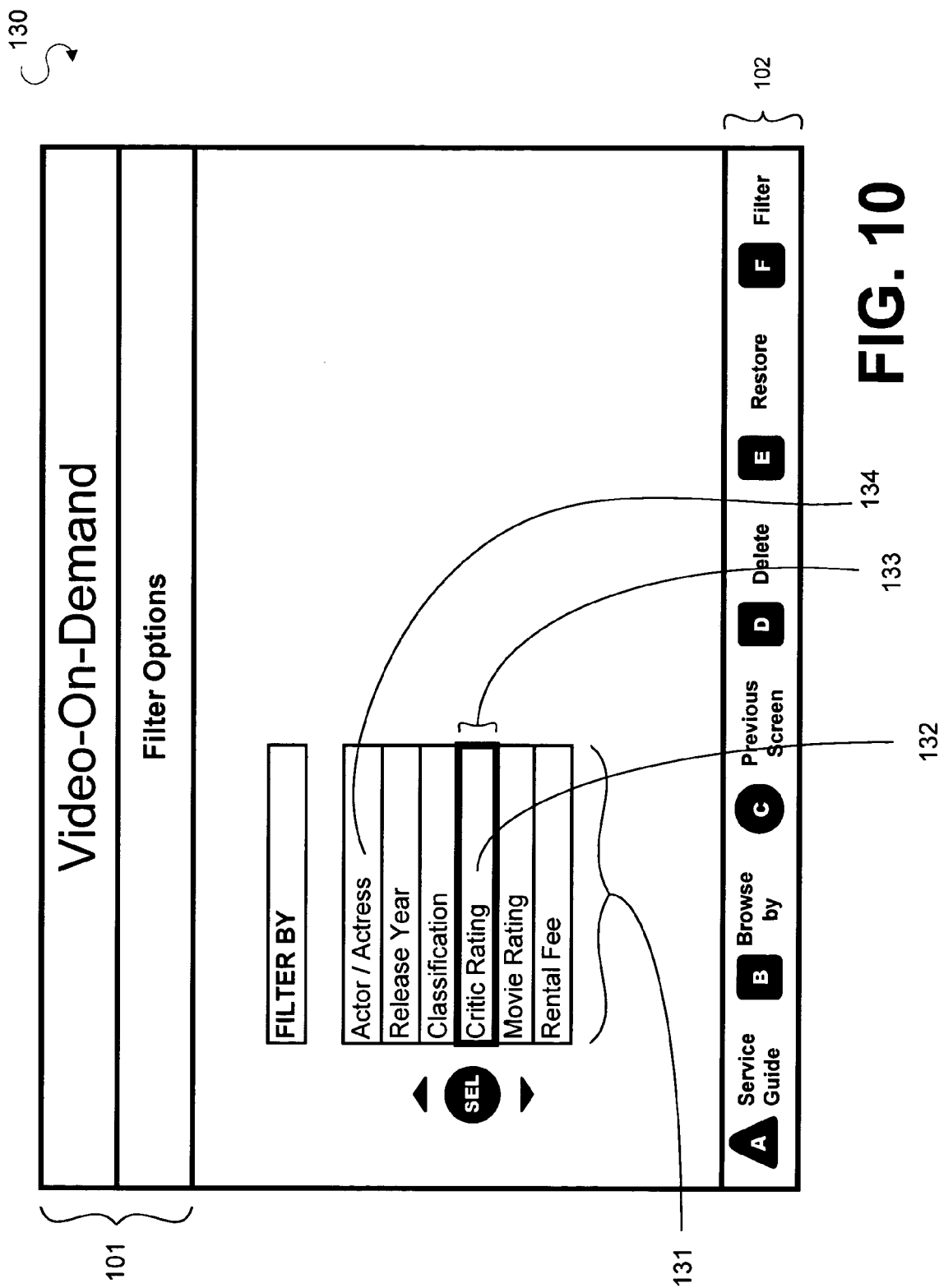
FIG. 10 depicts an example window that illustrates media filtering categories presented by the DHCT of FIG. 3.

FIG. 10 depicts an example window 130 illustrating media filtering categories. Example window 130 is presented to the user after the user activates the "F" button 90 on the remote control device 80. The filtering list 131 contains filtering categories, such as filtering category 132, and a highlighted filtering category area 133. A filtering category contains criteria that are used to remove or filter out media titles from media title lists that are presented to the user. Example filtering categories include release year (e.g. 1999), released after a year, released prior to a year, movie classification (such as comedy, drama, etc.), critic rating (such as one star, two star, etc.), movie rating (such as PG, PG-13, etc.), movies already viewed, and the cost of renting the movie. For example, in one implementation, the cost of renting a movie can be used as a filter to exclude movies that cost more than defined selectable amounts, and in another implementation, the user is able to enter the cost to use as the threshold. The user can use the remote control device 80 to select a desired media filtering category. Upon selection of a media filtering category, the user is presented with media filtering criteria falling under the selected media filtering category as illustrated in FIG. 11.

In an alternate embodiment, the MOD client application 63 comprises a text string matching sub-component that enables filtering based on text strings entered by the user for applicable filtering categories. For instance, the user can implement a filter to delete titles that feature a disliked leading actor or actress. Upon user selection of filter by leading actor/actress 134 in window 130, an intermediate window is displayed to the user for entering alphanumeric characters via an input device. In the absence of a keyboard, MOD client application causes display of a window comprising visual information for scrolling and selection of individual letters. A mapping of alphanumeric characters to input device keys can also be displayed to facilitate entering letters with the remote control device. Upon the user entering the name of a leading actor or actress, the media client application may proceed to verify correct name spelling by transmitting the input name to the MOD server. The MOD server sends an addressable message to DHCT 16 that gets input as data to MOD client application 63. The received message data from MOD server confirms the correct spelling, rectifies the spelling, or suggests close variants of the user-entered name. MOD client application 63 interprets the message data and presents it to the user. In the event that variants are displayed to the user, the user is prompted to select one of the displayed name variants or to cancel the filtering request.

In an alternate embodiment, a "filter in" function rather than a "filter out" function is implemented such that filter enactment causes those on-demand titles that do not match the filter's criteria to be removed from the media title list. Furthermore, when applicable, the function of a user-implemented filter can be selected by the user to function as a "filter in" or "filter out". Some filters in the set of available filters may not feature user-selectable "filter in" or "filter out" functionality but merely may default to either a "filter in" or "filter out" function. In an alternate embodiment, the MOD client application enacts capabilities to the user to filter only existing titles in the current media title list, to filter only future title additions to the media title list, or both.

Figure 11:
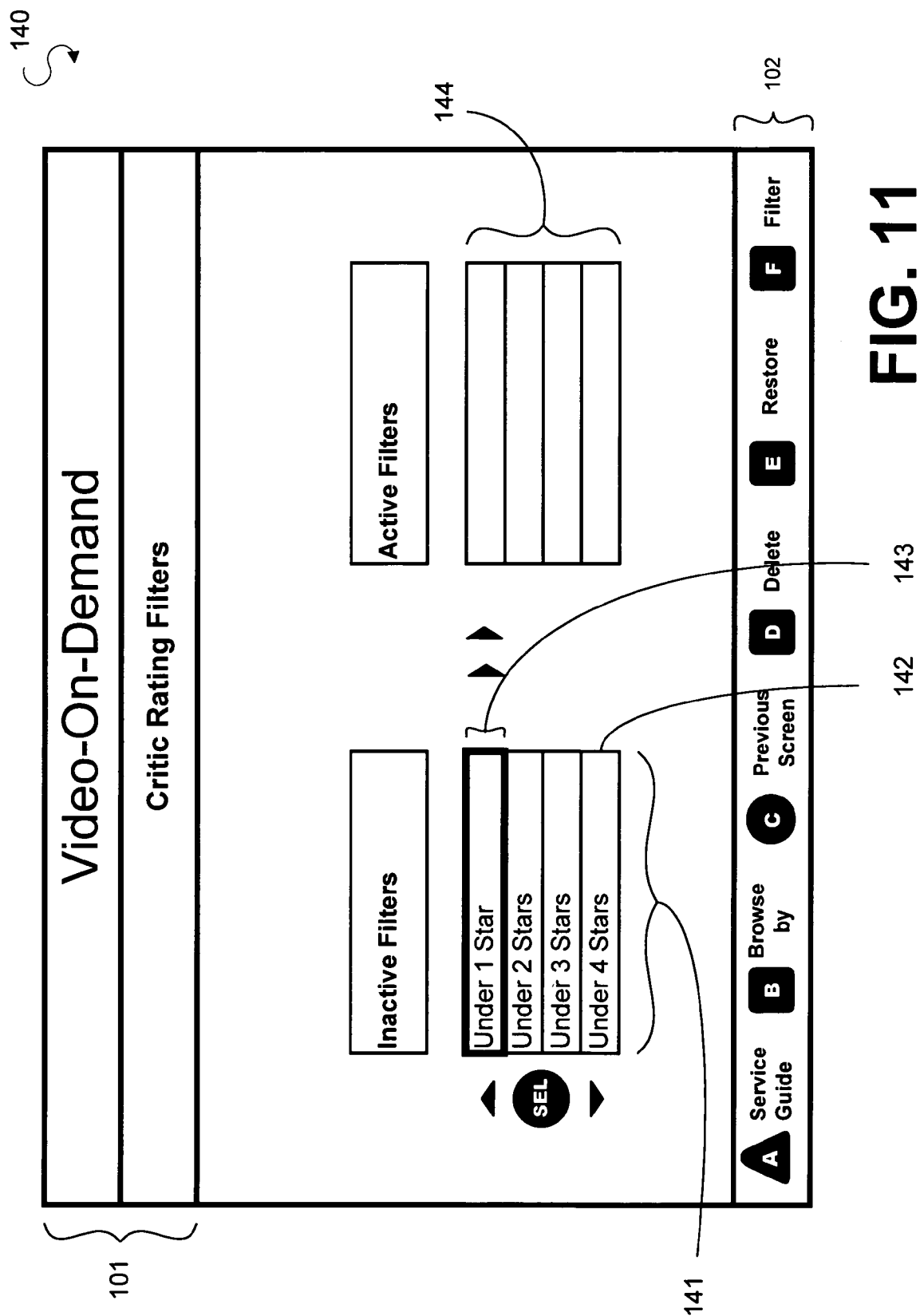
FIG. 11 depicts an example windows that illustrates filtering criteria corresponding to a filtering category shown in the example window of FIG. 10.
Figure 12:
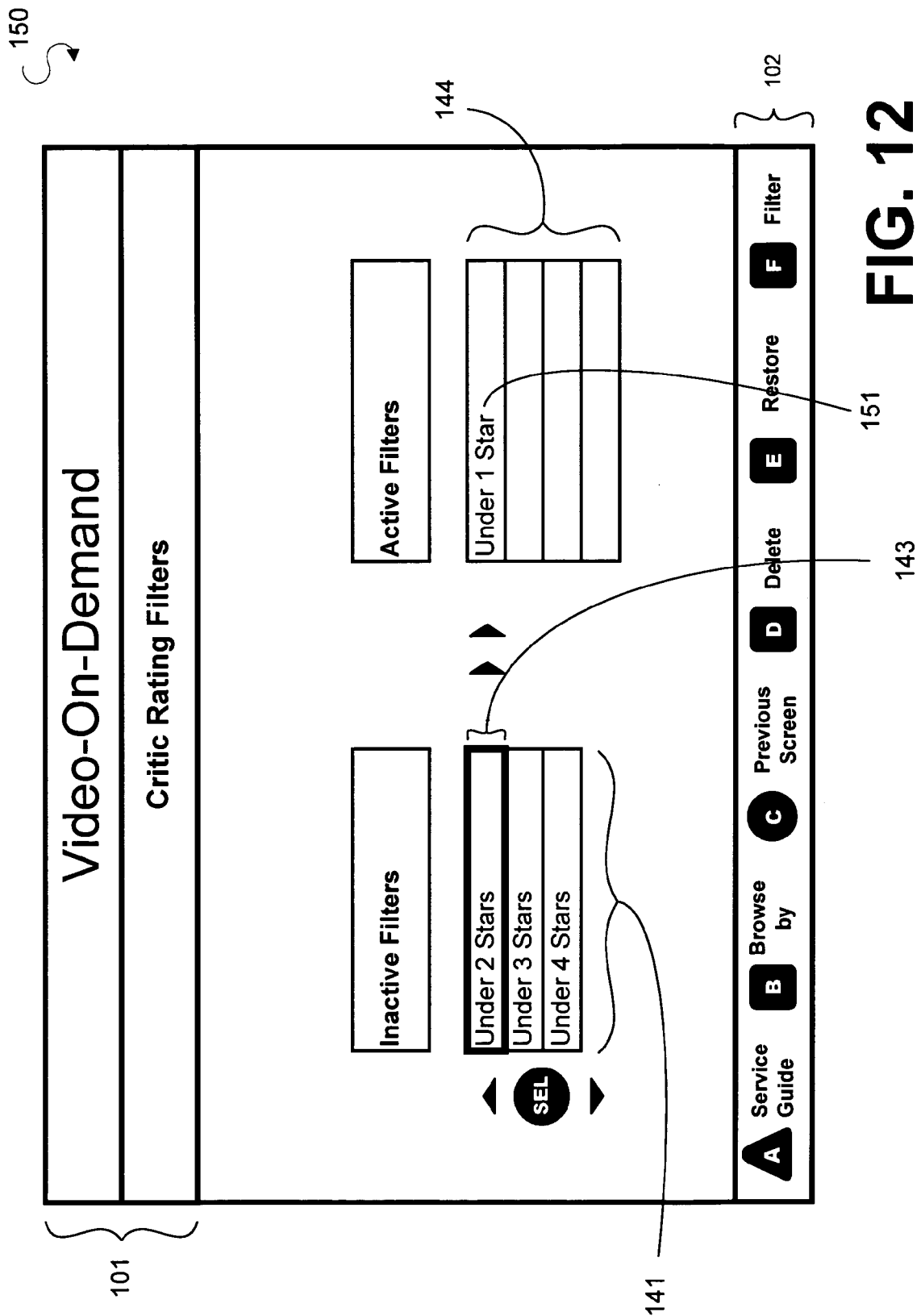
FIG. 12 depicts an example window that illustrates the activation of a filtering criterion shown in example window of FIG. 11.

FIGS. 11 and 12 are example windows 140 & 150 respectively illustrating the activation of a filtering criterion. The filtering criteria list 141 contains filtering criteria, such as filtering criterion 142, and a highlighted filtering criterion area 143. The user can use the remote control device 80 to select a desired filtering criteria. In this example, the user can filter out media titles corresponding to media titles that have critic ratings below one star by activating the select button on the remote control device 80. Referring now to FIG. 12, once a highlighted criterion is selected by the user, it becomes activated and is displayed in an active filters list 144. Upon activation, the filtering criterion is stored by MOD client application 63 in application memory 70 and is used to filter out media titles that meet the activated filtering criterion from media title lists that are presented to the user. In this example, media titles with critic ratings of under one star will be filtered out from media title lists that are presented to the user. In one embodiment, new media titles that are subsequently received by MOD client application 63 from MOD server application 19 (FIG. 2) are filtered according to currently active filtering criteria so that they are not included in media title lists presented to the user.

Figure 13:
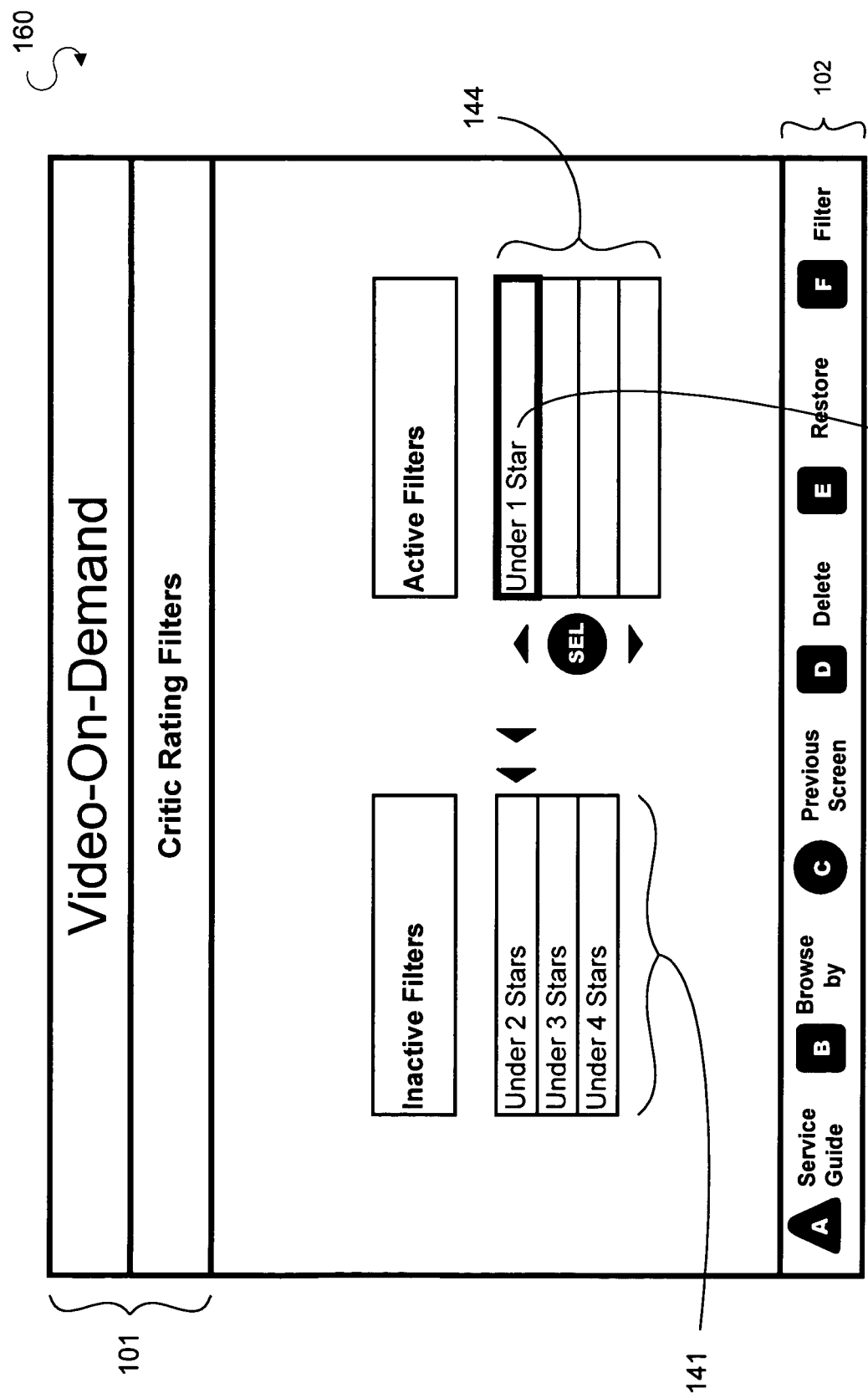
FIG. 13 depicts an example window that illustrates the de-activation of a filtering criterion shown in the example window of FIG. 12.

FIG. 13 depicts an example window 160 illustrating the de-activation of a filtering criterion. Example window 160 is presented to the user upon the activation of the right arrow button on the remote control device 80 while being presented with example window 150 (FIG. 12). Once an activated filtering criterion is selected by the user from the active filters list 144, it becomes de-activated, is removed from the active filters list 144, and is added back to the filtering criteria list 141. Upon de-activation, a filtering criterion is deleted from application memory 70 and is no longer used by the MOD client application 63 to filter out media titles.

Figure 14:
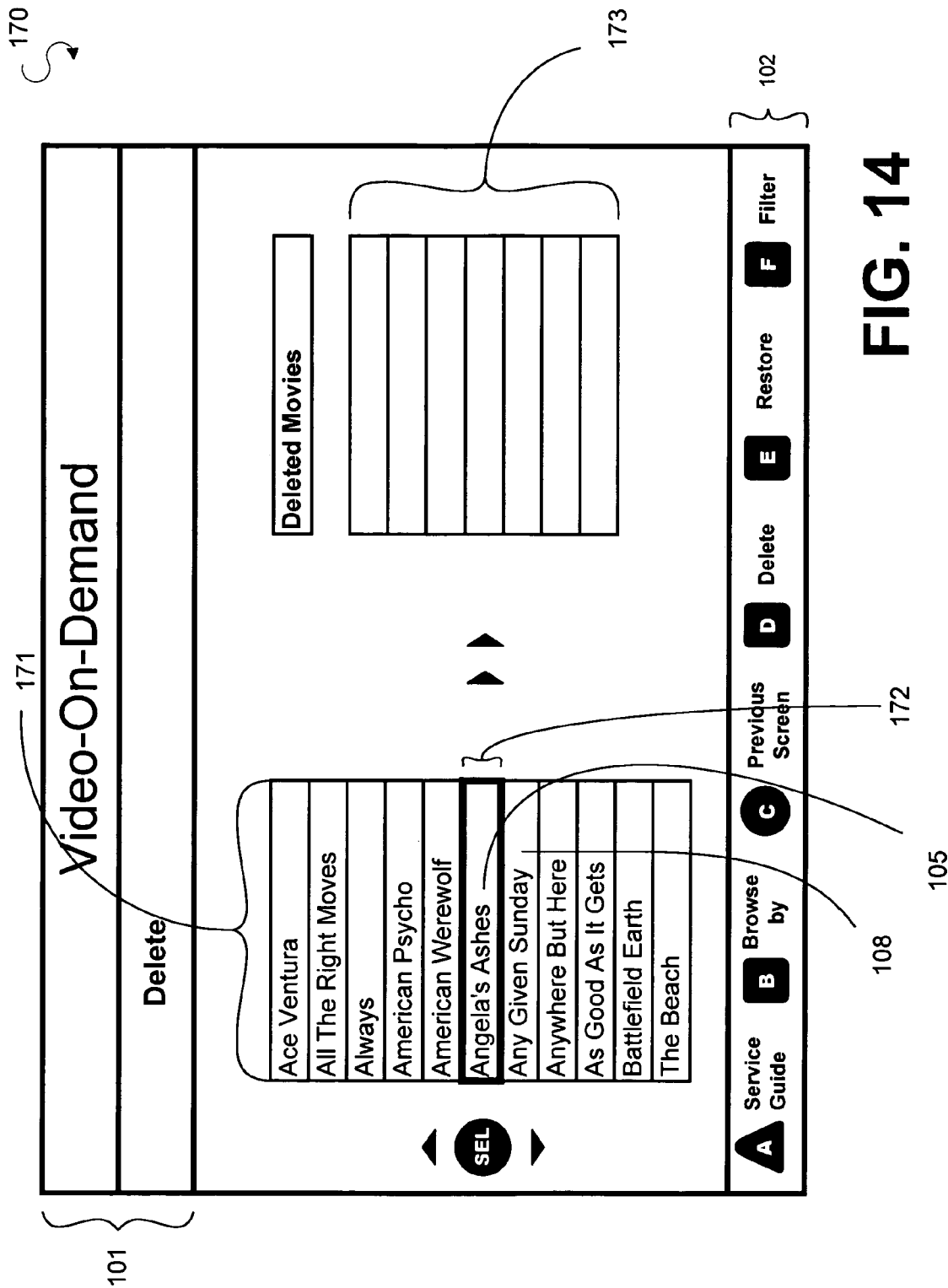
FIG. 14 depicts an alternative embodiment to the example window shown in FIG. 5, illustrating a media title list.
Figure 15:
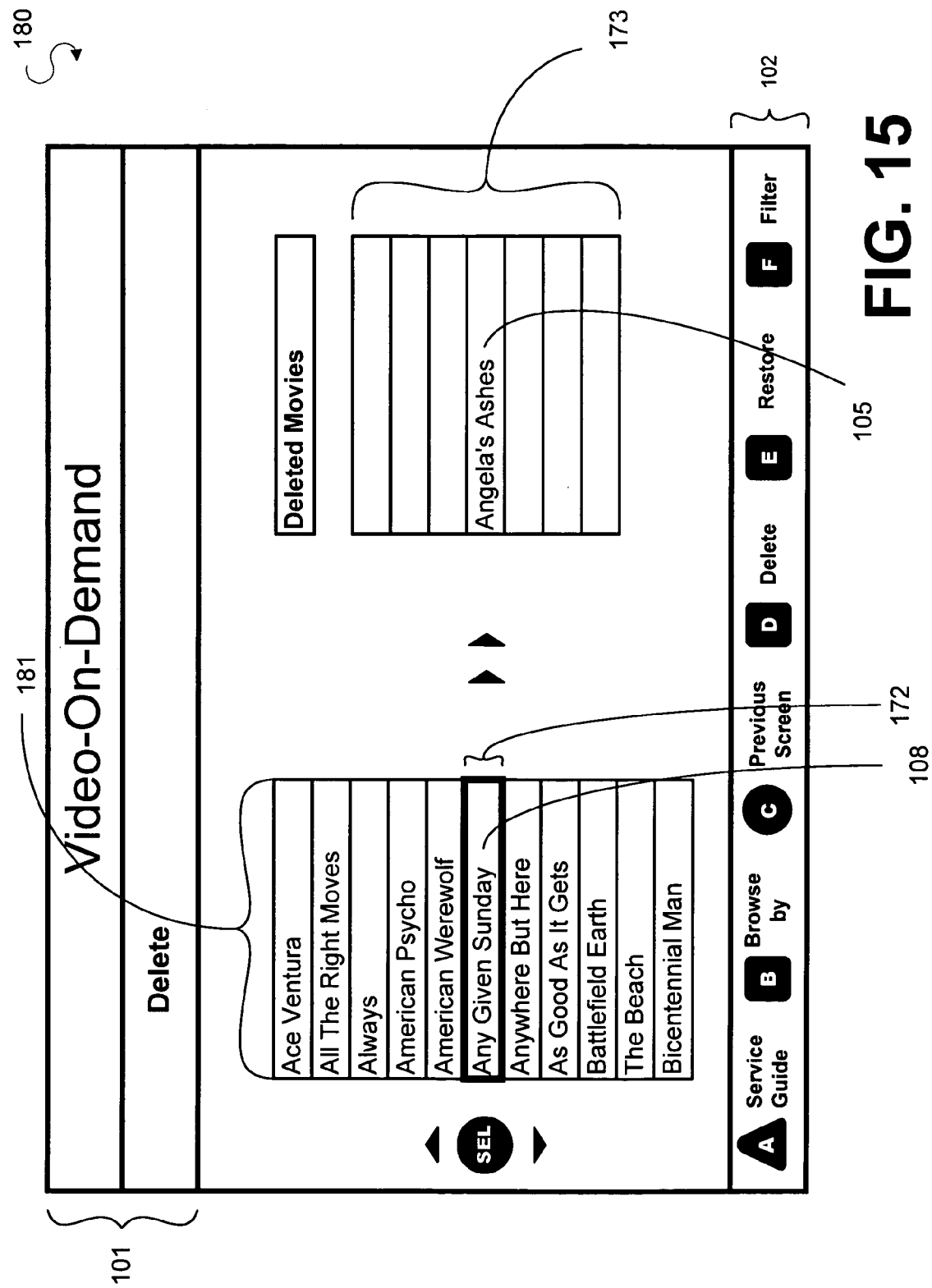
FIG. 15 depicts an alternative embodiment to the example window in FIG. 8, illustrating the deletion of a media title from the media title list shown in FIG. 14.

FIGS. 14 and 15 are example windows 170 and 180 respectively that illustrate an alternative embodiment to the media title deletion windows illustrated in FIGS. 5 and 8. In this embodiment, example window 170 is presented to the user after the user activates the "D" button 88 on the remote control device 80 while being presented with example window 100A (FIG. 5). The user may then activate the up and down arrow buttons 83, 84 on the remote control device 80 to browse the media title list 117 and the select button 87 to delete a currently highlighted media title from the media title list 171. Once a title is deleted from a media title list, it remains excluded from such list even after the list is presented to the user at a later time. The user may however restore a previously deleted title to the media title list from which it was deleted by following the procedure illustrated in FIG. 16. Referring now to FIG. 15, example window 180 is presented to the user after the user activates the select button 87 on the remote control device 80 while being presented with example window 170. The media title previously shown in the highlighted title area 172 is replaced by the next media title on the media title list 171 (FIG. 14) and is transferred to the deleted title list 173. In this example, the title "Angela's Ashes" 105 (FIG. 14) is replaced with the title "Any Given Sunday" 108 and is transferred to the deleted title list 173 as shown in FIG. 15.

Figure 16:
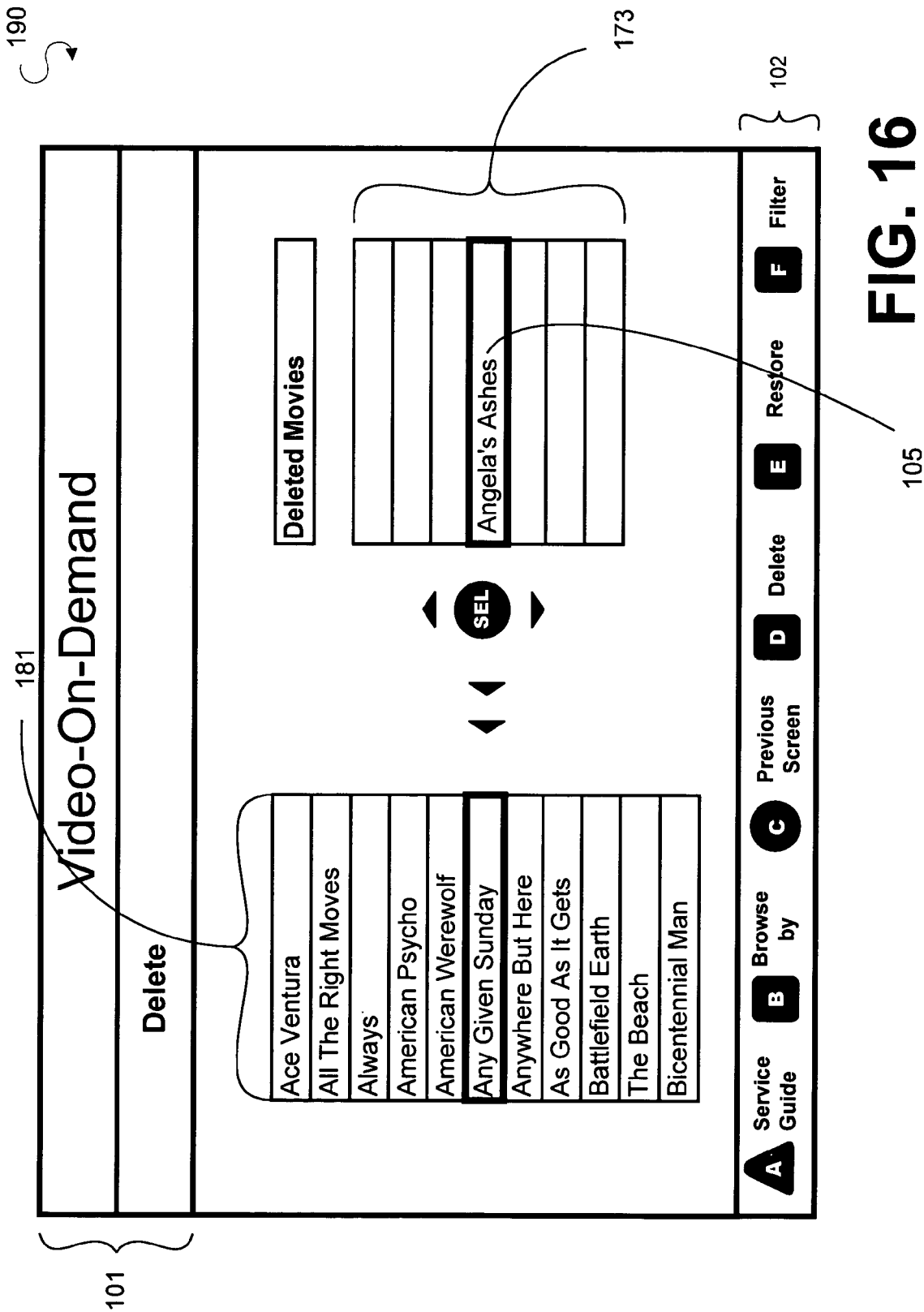
FIG. 16 depicts an example window that illustrates the process of restoring (undeleting) a deleted media title to the media title list shown in FIG. 15.

FIG. 16 depicts an example window 190 illustrating the process of undeleting a media title. Example window 190 is presented to the user after the user activates the right arrow button 86 on the remote control device 80 while being presented with example window 180 (FIG. 15). The user can undelete a highlighted media title by activating the select button 87. Once undeleted, a media title will be included in media title lists subsequently presented to the user.

In another embodiments, MOD client application 63 features the capability of creating a plurality of title removal or fine-tuning sets, each set designated to respectively retain the title viewing preferences of each individual viewer or member of the family. A title viewing preference set may simply be named with a suffice or prefix number or letter that individual viewers appropriate under personal agreements between themselves, or the set may be named by a user inputting alphanumeric strings with an input device such as a keyboard or remote control device.

It should be emphasized that the above-described embodiments of the present invention, particularly any "preferred embodiments", are merely possible examples of the implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

What is claimed is:

1. A method for providing media information to a user via an interactive media services client device coupled to a programmable television services server device, said method comprising:
    displaying a media title list that has at least one media title, each media title being displayed in a title area;
    receiving user input identifying a media title in a title area and requesting that said title area containing said media title be removed from a media title list;
    deleting said title area containing said media title from said media title list; and
    providing the user with a list of deleted media titles.

2. The method of claim 1, further comprising transmitting said user input via a remote control device.

3. The method of claim 1, further comprising identifying said media title by highlighting said media title in said title area.

4. The method of claim 1, wherein the media title identified by said user input is a video-on-demand media title.

5. The method of claim 1, wherein said media title list is displayed via a television.

6. The method of claim 1, further comprising the step of: restoring said title area containing said media title to said media title list.

7. The method of claim 1, further comprising storing information in client device memory identifying said media title as a deleted media title.

8. The method of claim 1, further comprising the step of: excluding said title area containing said media title from a media title list that is presented to the user at a future time.

9. The method of claim 1, wherein said client device is a television set-top box.

10. The method of claim 1, wherein said user input corresponds to the activation of only one button on a remote control device.

11. The method of claim 1, further comprising prompting said user to provide input as to whether deletion of said media title is to be permanent.

12. A media services system for providing media information to a user via an interactive media services client device coupled to a programmable media services server device, said system comprising:
    memory having a media title list that includes at least one media title, each media title being displayed in a title area;
    logic stored in said memory, said logic configured to cause a title area containing a media title identified by user input to be removed from a media title list; and
    logic configured to cause said client device to prompt said user to provide input as to whether deletion of said media title is to be temporary or permanent.

13. The system of claim 12, wherein said user input corresponds to the activation of one button on a remote control device.

* * * * *